United States Patent Office 2,943,987
Patented July 5, 1960

2,943,987

LOW PRESSURE POLYMERIZATION OF DIENES

William S. Anderson, Berkeley, Calif., assignor to Shell Oil Company, a corporation of Delaware No Drawing. Filed Feb. 25, 1958, Ser. No. 717,334

12 Claims. (Cl. 204—162)

This invention relates to novel processes for the polymerization of conjugated dienes. More particularly it relates to the polymerization of conjugated dienes using a novel class of polymerization catalysts and conditions.

It is known that conjugated dienes may be polymerized to produce cis 1,4-addition products. The processes whereby such polymers are produced are termed "low pressure processes" and are characterized by conducting the polymerization at temperatures below about 150° C. and pressures below about 500 p.s.i. The low pressure processes universally employ catalysts which are termed "low pressure catalysts." Such catalysts comprise the reaction product of organo-metallic compounds, as alkyl aluminums, and certain metal salts as titanium halides. Such catalysts when employed for the low pressure polymerization of conjugated dienes, as butadiene, afford three principal disadvantages. The first disadvantage is that the polymer heretofore always contained small amounts of catalyst residues which are harmful to the product. While current theory is that the low pressure catalyst residues are not bonded to the polymer prior attempts to produce polymer which is free of catalyst residues has not been fully successful. The second disadvantage is that yields are not high and waste of monomer may be realized. Another disadvantage of the prior art is that the alkyl aluminums are difficult to handle because the more effective species may react violently when exposed to the atmosphere.

It is an object of this invention to provide processes for the polymerization of conjugated dienes wherein the product is substantially free of catalyst residues. It is another object of this invention to produce cis-1,4-polymer of conjugated dienes which are substantially free of catalyst residues by processes which afford substantially complete conversion of the monomer. Another object of this invention is to provide processes for the polymerization of conjugated dienes to the cis-1,4 addition product without using the flammable alkyl aluminum compounds. Other objects will become apparent as the description of the invention proceeds.

These and other objects are accomplished by the process comprising polymerizing a conjugated diene in the presence of a catalyst comprising free mercury, a heavy metal salt selected from the group consisting of halides, nitrates and sulfates, and a mercury light source. The conjugated dienes will polymerize to produce a product which is predominantly the cis-1,4 addition product. After the polymerization is complete the polymer is separated from the catalyst, which is a physical mixture of mercury and the metal salt, by any conventional means which will be considered in greater detail hereinafter.

The salt employed as one of the catalyst components may be any halide, nitrate or sulfate of a heavy metal. It will be found, however, that not all heavy metals are equally suitable as various species thereof will cause faster rates, higher conversions, higher yields of the cis-1,4 addition product, or the like. In a series of experiments it is found that the halides are most preferred followed by nitrates and sulfates of heavy metals. Of the halides, the chlorides and bromides are most preferred with the others being less preferred. The most preferred heavy metals are those selected from group VIII of the periodic table with cobalt and nickel being most preferred. Thereafter other heavy metals are useful, such as titanium, vanadium, chromium, zirconium and the like. As a generalization it may be stated that the heavy metal salts of the metals within groups IV$b$, V$b$ and VI$b$ and VIII of the periodic table are most preferred with other heavy metal being less preferred. In the description of this invention when reference is made to a heavy metal by its location in the periodic table it will be understood that the Deming periodic table of elements is intended.

The quantity of the heavy metal salt employed may be conveniently based on the quantity of conjugated diene to be polymerized. In the preferred embodiment the metal salt is used in an amount ranging from 0.001 to about 5 grams per mole of diene. More preferred, however, are those cases wherein the metal salt ranges from about 0.01 to about 1 gram per mole of the conjugated diene. It must be remembered however, that this amount will vary considerably depending upon the effectiveness of the particular metal salt under the conditions of polymerization. The free mercury normally is employed in amounts ranging from about .001 to about 100 grams of mercury per liter of diene with about .01 to about 1 gram being satisfactory in the more preferred embodiments of this invention. In the preferred procedure, the mercury is added as the free liquid metal. In addition mercury may be added to the system in the form of organo-mercury compounds. Suitable organo-mercury compounds include the alkyl mercurys as the diethyl, dipropyl, dibutyl and other mercury alkyls having up to 10 carbon atoms with the lower mercury compounds being more preferred. Aromatic mercury compounds may also be employed, as diphenyl mercury, but they are less preferred.

Any mercury light source is suitable for the processes of the present invention but faster rates are obtained, as the intensity of the light increases. Better results are obtained with a high pressure mercury arc lamp such as the 1000 watt mercury lamp. Another suitable mercury light source is that identified as H–100–A4. Mercury light sources of lower wattage may be employed in which case it will be necessary that they be placed closer to the reaction mixture in order to obtain suitable polymerization rates. Mercury lamps of this latter type are represented by the conventional germicidal lamps. In conducting the polymerization of this invention consideration should be given to the location of the lamp within the reactor. In such cases the lamp should be located a sufficient distance from the reacting mixture so as to avoid splattering of polymer on the surface of the lamp. In cases where the polymerization is to be conducted in smaller batches, the mercury light source may be located outside the reaction vessel, in which event the vessel should be made of quartz or some other transparent material which will transmit the mercury light. A representative vessel of this type is one manufactured of Vycor glass.

It is an advantage of the present invention that the polymerizations may be conducted under moderate conditions of temperature and pressure. All that is required is that the reactor be charged with the conjugated diene, the heavy metal salt and the mercury after which the mercury light is turned on. It is preferred that the mercury light be on throughout the polymerization although it will be found that polymerization will continue after the start even though the mercury light is off. A short induction period may be experienced before active polymerization commences. The induction period will vary depending upon the intensity of the light source and the nature of the metal salt and to a lesser degree the particular conjugated diene which is being polymerized. The induction period may be reduced considerably by heating the contents of the reactor until polymerization begins after which further heat need not be applied. The polymerization is most conveniently conducted at about normal temperatures although temperatures as low as 0° C. and as high as 50° C. may be usefully employed. When the conjugated diene is normally a gas, as in the case of butadiene, it may be fed into the reactor and polymerized at normal pressures but if desired higher pressures may be employed. Pressures in excess of about 500 p.s.i. are not required.

In actual practice the polymerization proceeds satisfactorily without conducting the reaction in the presence of a diluent. It is more preferred, however, that an inert hydrocarbon diluent be employed because it affords greater contact between the catalyst and the conjugated diene thereby increasing polymerization rates. Of equal importance, the use of an inert hydrocarbon diluent will facilitate the separation of the polymer from the reactor at the end of the polymerization. When the polymerization is conducted in the presence of an inert hydrocarbon diluent the polymer will form in solution and considerably facilitate polymer recovery. The reactor is desirably equipped with an agitator thereby affording still greater contact between the catalyst and the conjugated diene to be polymerized. Any inert liquid hydrocarbon diluent may be employed such as n-heptane, octane, isooctane, benzene, toluene, the xylenes, or the like. It will be found to be more suitable to employ a hydrocarbon diluent having a lower boiling point as this will facilitate the ultimate separation and recovery of the diluent. Thus, for example, toluene is preferred to butylbenzene and n-heptane is preferred to dodecane.

After the polymerization is complete the polymer is removered by any conventional method. When the process is conducted in the presence of a hydrocarbon diluent all that is required is that the mixture be filtered whereupon the mercury and heavy metal salt remain as the solid fraction. In some cases it will be desirable to add additional hydrocarbon diluent in order to facilitate filtration particularly when the polymer solution is more viscous. The polymer is then coagulated upon the addition of a small amount of a lower alcohol such as methanol, ethanol, isopropanol, or the like. The polymer thus recovered will be found to be substantially free of catalyst residues and contain a high proportion of the cis-1,4-addition product. The solid catalyst which has remained from the first filtration may be recovered and reused by merely charging it into the reactor. It will be found to be advantageous however, to rinse it once or twice to wash away any residual polymer.

It is a particular advantage of the present invention that rather high conversions of the conjugated diene will be experienced particularly in the case of the lower conjugated dienes such as butadiene and isoprene. Conversions of other conjugated dienes will be somewhat less although they will be relatively high. Among the other conjugated dienes which may be suitably polymerized by the processes of this invention there may be mentioned 1,3-pentadiene, 2,3-dimethyl-1, 3-butadiene, 2 ethyl-1,3-butadiene, 4 methyl-1,3-hexadiene, 2 methyl-1,3-pentadiene, 2 isopropyl-1,3-butadiene, 2,4,6-octatriene, 2-allyl-1,3-butadiene, and the like. In addition, two or more conjugated dienes may be copolymerized as for example, butadiene and isoprene.

The processes of this invention are more suitable for batch operations than for continuous operations. Continuous operations may be undertaken in which event larger reactors will be required in order to afford the required residence times. With larger reactors, it will be readily appreciated that it may be more beneficial to provide several mercury lamps.

The processes of this invention will be described in the following examples which are intended to illustrate the embodiments of this invention.

*Example I*

To a Vycor glass tube is charged .5 gram of cobalt chloride and .2 gram of mercury. Thereafter 4 grams of butadiene contained in 100 ccs. of n-heptane is added. The cobalt chloride is previously heated at 100–200° C. and .001 mm. Hg in order to remove any residual moisture. The Vycor tube is then sealed and irradiated with a 100 watt mercury lamp identified as AH–100–4. In this example the polymerization is conducted at room temperature for several hours, excluding the induction period. There is obtained 4 grams of polymer having a cis 1,4-content of about 91% after working up the contents of the tube by filtering and coagulating with 10 ml. of methanol.

*Example II*

The same procedure of Example I is repeated except that in this case the polymerization is conducted at about 35° C. The polymerization is complete in about half the time and the yield of the cis 1,4-polymer is the same.

*Example III*

The procedure of Example I is repeated except that nickel nitrate replaces the cobalt chloride. In this case polymerization rates are somewhat longer although 4 grams of polymer are produced. In a companion experiment substantial improvements in polymerization rates are obtained by conducting the polymerization at about 50° C.

*Example IV*

The procedure of Example I is repeated except that the light source is a 1000 watt high pressure mercury arc lamp. In this case polymerization is complete within a couple of hours. In a companion experiment still faster polymerization rates are obtained by conducting the polymerization in the order of about 40° C.

*Example V*

In two companion experiments nickel bromide and iron chloride replace the cobalt chloride of Example I, respectively. In these cases longer reaction times are required which appears to be largely attributable to the longer induction period required. When the reaction mixture is additionally treated at temperatures in the order of about 50° C. the induction period is substantially reduced. In these cases the polymer contains somewhat less than 90% of the cis 1,4-addition product.

*Example VI*

The procedure of Example I is repeated except that .5 gram of titanium trichloride and .1 gram of mercury is used. The mercury lamp is the same as that used in Example I and the polymerization is conducted at room temperature. In this case complete conversions required a longer reaction time. The cis 1,4-content is somewhat lower than that in Example I but still formed a predominant amount of the total polymer produced. In a companion experiment the polymerization is conducted at about 40° C. whereupon the reaction is complete after several hours. The polymer has a cis 1,4-content in the order of about 85%.

*Example VII*

The procedure of Example I is repeated except that isoprene is dissolved in the diluent. The polymer thus obtained has a high cis 1,4-content and complete conversion is realized in several hours at about 40° C.

Example VIII

In a series of polymerizations employing the above procedures at 40° C. it is found that zirconium trichloride, chromium chloride, and vanadium chloride will polymerize butadiene to produce a polymer having a predominant portion of the cis 1,4-addition product. The rates of polymerization and the conversions vary widely as the species of the heavy metal salt is varied. In a similar manner nickel sulfate and zirconium sulfate likewise polymerizes butadiene as well as chromium nitrate, cobalt nitrate, cobalt bromide and similar salts.

Example IX

The procedure of Example I is repeated except that .5 ml. of dibutyl mercury replaces the free mercury. Substantially the same results are obtained except that the induction period is longer. A reduced induction period is experienced when the temperature is initially raised to 75° C.

From the foregoing examples and description it will be readily appreciated that the present invention is capable of numerous modifications not only in regard to the particular heavy metal salts which are employed but also in regard to the polymerization conditions. Such modifications however are within the spirit of this invention.

I claim as my invention:

1. The process comprising polymerizing a conjugated diene in the presence of a catalyst composition comprising free mercury and a heavy metal salt selected from the group consisting of halides, nitrates and sulfates, the polymerization being conducted by exposing the reaction mixture to a mercury light source, and recovering a polymer containing a major portion of the cis 1,4-addition product of the conjugated diene.
2. The process of claim 1 in which the heavy metal salt is cobalt chloride.
3. The process of claim 1 in which the heavy metal salt is nickel chloride.
4. The process of claim 1 in which the heavy metal salt is titanium trichloride.
5. The process of claim 1 in which the heavy metal salt is cobalt nitrate.
6. The process of claim 1 in which the heavy metal is nickel nitrate.
7. The process which comprises polymerizing butadiene in the presence of a catalyst comprising free mercury and a heavy metal salt selected from the group consisting of halides, nitrates and sulfates, the polymerization being conducted by exposing the reaction mixture to a mercury light source, and recovering a polymer containing a major portion of the cis 1,4-addition product of the conjugated diene.
8. The process of claim 7 in which the heavy metal salt is cobalt chloride.
9. The process of claim 7 in which the heavy metal salt is nickel chloride.
10. The process of claim 7 in which the heavy metal salt is titanium trichloride.
11. The process of claim 7 in which the heavy metal salt is cobalt nitrate.
12. The process of claim 7 in which the heavy metal salt is nickel nitrate.

References Cited in the file of this patent

UNITED STATES PATENTS

| | | |
|---|---|---|
| 1,746,168 | Taylor | Feb. 4, 1930 |
| 1,970,973 | Palmaer | Aug. 21, 1934 |
| 2,745,802 | Schmidt | May 15, 1956 |

OTHER REFERENCES

Chemistry and Industry, No. 10 (Mar. 9, 1957), pages 296–298.

Chemical Engineering, vol. 62 (February 1955), pages 165, 166 and 172.

Ellis et al.: "Chemical Action of Ultraviolet Rays," page 408.